United States Patent
Kano et al.

(10) Patent No.: US 7,842,754 B2
(45) Date of Patent: Nov. 30, 2010

(54) THERMOPLASTIC ELASTOMER COMPOSITION

(75) Inventors: Takamitsu Kano, Aichi (JP); Toru Tamura, Handa (JP); Motoyuki Sugiura, Anjo (JP)

(73) Assignee: NOF Corporation, Shibuya-ku, Tokyo ( * ) Notice: Subject to any disclaimer, the term of this patent is extended or adjusted under 35 U.S.C. 154(b) by 0 days.

(21) Appl. No.: 11/917,968

(22) PCT Filed: Aug. 8, 2006

(86) PCT No.: PCT/JP2006/315635

§ 371 (c)(1),
(2), (4) Date: Dec. 18, 2007

(87) PCT Pub. No.: WO2007/018201

PCT Pub. Date: Feb. 15, 2007

(65) Prior Publication Data

US 2008/0221270 A1 Sep. 11, 2008

(30) Foreign Application Priority Data

Aug. 8, 2005 (JP) ............................. 2005-229789

(51) Int. Cl.
C08L 51/06 (2006.01)
C08L 67/00 (2006.01)
(52) U.S. Cl. ............................. 525/64; 525/63; 525/70; 525/88; 525/92 B; 525/92 F; 525/92 E; 524/457; 524/294
(58) Field of Classification Search ................ 525/63, 525/64, 70, 88, 92 B, 92 F, 92 E; 524/457, 524/294
See application file for complete search history.

(56) References Cited

U.S. PATENT DOCUMENTS

| 4,880,877 | A | | 11/1989 | Sugimori et al. | |
|---|---|---|---|---|---|
| 4,992,510 | A | | 2/1991 | Sugimori et al. | |
| 5,550,190 | A | * | 8/1996 | Hasegawa et al. | ......... 525/92 A |
| 6,179,008 | B1 | * | 1/2001 | Kawazura et al. | ........... 138/125 |
| 2004/0147674 | A1 | * | 7/2004 | Kakeda et al. | ................. 525/88 |
| 2005/0288434 | A1 | * | 12/2005 | Sugiura et al. | ................. 525/70 |
| 2006/0041056 | A1 | | 2/2006 | Sunagawa et al. | |
| 2006/0047048 | A1 | * | 3/2006 | Sugiura et al. | .............. 524/457 |

FOREIGN PATENT DOCUMENTS

| EP | 0295706 | | 12/1988 |
|---|---|---|---|
| EP | 1489138 | | 12/2004 |
| JP | 62-151445 | | 7/1987 |
| JP | 01-306447 | | 12/1989 |
| JP | 03-020351 | | 1/1991 |
| JP | 05-025374 | | 2/1993 |
| JP | 11-293098 | | 10/1999 |
| JP | 2000-034395 | | 2/2000 |
| JP | 2000-186181 | | 7/2000 |
| JP | 2004-2743 | | 1/2004 |
| WO | WO 03/080723 A1 | * | 10/2003 |
| WO | WO 2004/041934 | | 11/2003 |
| WO | WO 2004046242 A1 | * | 6/2004 |

OTHER PUBLICATIONS

Brandrup, J.; Immergut, Edmund H.; Grulke, Eric A.; Abe, Akihiro; Bloch, Daniel R. Polymer Handbook (4th Edition). John Wiley & Sons.*
Snapshot of the Modiper Website Taken Aug. 31, 2010.*
Extended European Search Report issued in EP 06796314.0.
International Preliminary Report on Patentability, PCT/JP2006/315635.

* cited by examiner

Primary Examiner—Vasu Jagannathan
Assistant Examiner—Mark S Kaucher
(74) Attorney, Agent, or Firm—Fish & Richardson P.C.

(57) ABSTRACT

Disclosed is a thermoplastic elastomer composition obtained by dynamically crosslinking a composition composed of a component (A), a component (B) and a component (C) with 0.05 to 5 parts by mass of a crosslinking agent per 100 parts by mass of the component (A). The component (A) is 50 to 85 parts by mass of an acrylic rubber prepared by copolymerizing a monomer mixture mainly containing an alkyl acrylate and also containing 0.5 to 15% by mass of an epoxy group-containing monomer. The component (B) is 15 to 50 parts by mass of a thermoplastic polyester resin. The component (C) is 1 to 35 parts by mass of a graft copolymer or a precursor thereof per 100 parts by mass of the total of the components (A) and (B), and the graft copolymer is composed of an olefin polymer segment and a vinyl copolymer segment.

7 Claims, No Drawings

THERMOPLASTIC ELASTOMER COMPOSITION

CROSS-REFERENCE TO RELATED APPLICATIONS

This application is a U.S. national stage under 35 U.S.C. §371 of PCT/JP2006/315635 filed Aug. 8, 2006, which in turn claims priority to Japan Patent Application No. 2005-229789 filed Aug. 8, 2005. These applications are herein incorporated by reference.

TECHNICAL FIELD

The present invention relates to a thermoplastic elastomer composition having good moldability, used as material for automotive molded products such as a packing, a sealing compound and a hose. Particularly, the present invention relates to a thermoplastic elastomer composition from which a molded product having flexibility, heat resistance and oil resistance can be produced.

BACKGROUND ART

Acrylic rubber has the next highest heat resistance after fluororubber and silicone rubber, endures a high temperature of 150° C. or more and has resistance to lubrication oils such as engine oil and gear oil. Thus, it is used in the form of automotive molded products contacting lubrication oils under a high temperature atmosphere, such as, for example, a packing, a gasket, a sealing compound and a hose. A molded product using acrylic rubber is produced by injecting a mixture of acrylic rubber with various compounding ingredients such as a filler, an age resister, a processing aid and a crosslinking agent into a mold and subjecting the mixture to primary cure and then secondary cure. There is a cumbersome crosslinking step in the production process of a molded product of acrylic rubber.

In recent years, a thermoplastic elastomer produced without a vulcanization step and having moldability similar to that of a thermoplastic resin is being widely used as a material (raw material) alternative to a vulcanized rubber in automobile interior and exterior parts and in the electrical field. It has been attempted to substitute a thermoplastic elastomer for acrylic rubber. For example, the present applicant has proposed an olefin thermoplastic elastomer obtained by melt-kneading an acrylic resin, a graft copolymer comprising an olefin polymer segment and a vinyl polymer segment, a crosslinking agent, and a co-crosslinking agent (Patent document 1).

In addition, the following are known as conventional techniques for thermoplastic elastomer compositions: a thermoplastic elastomer composition comprising a thermoplastic polyester resin and a covalently-crosslinked acrylic rubber (Patent document 2); a thermoplastic elastomer composition produced by subjecting a mixture composed of 30 to 90% by weight of a thermoplastic copolyester elastomer and 70 to 10% by weight of an epoxy group-containing (meth)acrylate copolymer rubber to dynamic crosslinking using a polyvalent carboxylic acid compound (Patent document 3); and a thermoplastic elastomer composition comprising a thermoplastic ester polymer phase and a rubber phase containing a dynamically-crosslinked acrylic rubber (Patent document 4).

Patent document 1: Japanese Laid-Open Patent Publication No. 2004-002743

Patent document 2: Japanese Laid-Open Patent Publication No. 01-306447

Patent document 3: Japanese Laid-Open Patent Publication No. 05-025374

Patent document 4: Japanese Laid-Open Patent Publication No. 2000-034395

DISCLOSURE OF THE INVENTION

However, because the olefin thermoplastic elastomer described in Patent document 1 is formed only from the crosslinked acrylic rubber and the graft copolymer having an olefin polymer segment, it has a relatively low heat resistance and is also inferior in oil resistance under such a high temperature as exceeding the melting point of the graft copolymer.

Each of the thermoplastic elastomer compositions described in Patent documents 2, 3 and 4 is a two-component system consisting substantially of a thermoplastic polyester resin and a crosslinked acrylic rubber, and lacks in the compatibility between the thermoplastic polyester resin and the crosslinked acrylic rubber, which does not enable effects of both components to be sufficiently exerted. Thus, these thermoplastic elastomer compositions have had a problem that they are insufficient in the moldability and provide molded products having reduced flexibility. A thermoplastic elastomer composition having good moldability is thus now not obtained from which a molded product having flexibility, heat resistance and oil resistance can be produced.

An object of the present invention is to provide a thermoplastic elastomer composition having good moldability, from which a molded product having flexibility, heat resistance and oil resistance can be produced.

To achieve the above object, the present invention provides a thermoplastic elastomer composition obtained by dynamically crosslinking a composition comprising a component (A), a component (B) and a component (C) using 0.05 to 5 parts by mass of a crosslinking agent per 100 parts by mass of the component (A). The component (A) is 50 to 85 parts by mass of an acrylic rubber prepared by copolymerizing a monomer mixture mainly comprising at least one of an alkyl acrylate ester and an alkoxyalkyl acrylate ester, wherein the mixture comprises 0.5 to 15% by mass of an epoxy group-containing monomer. The component (B) is 15 to 50 parts by mass of a thermoplastic polyester resin. The component (C) is 1 to 35 parts by mass, per the total 100 parts by mass of the components (A) and (B), of a graft copolymer or a precursor thereof comprising an olefin polymer segment formed from ethylene and a polar monomer and a vinyl copolymer segment formed from vinyl monomers at least including an alkyl acrylate ester, wherein one of the olefin polymer segment and the vinyl copolymer segment forms a matrix phase and the other forms a dispersed phase in the matrix phase.

The thermoplastic elastomer composition preferably further comprises a trimellitate ester or a polyester as a plasticizer.

BEST MODE FOR CARRYING OUT THE INVENTION

A representative embodiment of the present invention is described below in detail.

A representative embodiment of the thermoplastic elastomer composition is a composition which is used as a material for automotive parts such as a packing and a sealing compound, can show good moldability and provides a molded product rich in flexibility and capable of exhibiting heat resistance and oil resistance. Specifically, the thermoplastic elastomer composition is a composition obtained by dynamically crosslinking a composition comprising a component (A), a component (B) and a component (C) using 0.05 to 5 parts by mass of a crosslinking agent per 100 parts by mass of the component (A).

The component (A): 50 to 85 parts by mass of an acrylic rubber prepared by copolymerizing a monomer mixture mainly comprising at least one of an alkyl acrylate ester and an alkoxyalkyl acrylate ester, wherein the mixture contains 0.5 to 15% by mass of an epoxy group-containing monomer.

The component (B): 15 to 50 parts by mass of a thermoplastic polyester resin.

The component (C): 1 to 35 parts by mass, per the total 100 parts by mass of the components (A) and (B), of a graft copolymer or a precursor thereof comprising an olefin polymer segment formed from ethylene and a polar monomer and a vinyl copolymer segment formed from vinyl monomers at least including an alkyl acrylate ester, wherein one of the olefin polymer segment and the vinyl copolymer segment forms a matrix phase and the other forms a dispersed phase in the matrix phase.

Each of the components will now be described.

<Component (A) Acrylic Rubber>

The acrylic rubber imparts flexibility (elasticity), heat resistance and oil resistance to a molded product of the thermoplastic elastomer composition. The acrylic rubber is obtained by copolymerizing a monomer mixture mainly comprising at least one of an alkyl acrylate ester and an alkoxyalkyl acrylate ester, wherein the mixture contains 0.5 to 15% by mass of an epoxy group-containing monomer.

Examples of the alkyl acrylate ester include methyl acrylate, ethyl acrylate, n-propyl acrylate, isopropyl acrylate, n-butyl acrylate, isobutyl acrylate, tert-butyl acrylate, n-pentyl acrylate, n-hexyl acrylate, n-heptyl acrylate, n-octyl acrylate, 2-ethylhexyl acrylate, nonyl acrylate, decyl acrylate, and dodecyl acrylate. Particularly preferred is an alkyl acrylate ester whose alkyl group has 2 to 4 carbon atoms in that it can exhibit excellent flexibility and oil resistance.

Examples of the alkoxyalkyl acrylate ester include an alkoxyalkyl acrylate ester whose alkyl group has 2 to 4 carbon atoms, such as, for example, 2-methoxyethyl acrylate, 2-ethoxyethyl acrylate and 2-butoxyethyl acrylate. Among these, particularly preferred is 2-methoxyethyl acrylate in that it can exhibit excellent oil resistance. These monomers are used alone or in a combination of two or more thereof by proper selection. The content of at least one of an alkyl acrylate ester and an alkoxyalkyl acrylate ester in the acrylic rubber is preferably 85 to 99.5% by mass. The content of 85 to 99.5% by mass facilitates the production of a molded product excellent in flexibility from the thermoplastic elastomer composition and makes the acrylic rubber easy to be sufficiently crosslinked.

As used herein, the term "an epoxy group-containing monomer" refers to a vinyl monomer having an epoxy group in the molecule. Any common epoxy group-containing monomer may be used as the epoxy group-containing monomer. Examples thereof include glycidyl acrylate, glycidyl methacrylate, vinyl glycidyl ether, and allyl glycidyl ether. A preferred epoxy group-containing monomer is glycidyl (meth)acrylate. Acrylic and methacrylic are herein indicated with (meth)acrylic. The content of the epoxy group-containing monomer copolymerized in the acrylic rubber is 0.5 to 15% by mass, preferably 1 to 10% by mass. The epoxy group-containing monomer content of 0.5 to 15% by mass facilitates the sufficient and appropriate crosslinking of the acrylic rubber, easily provides a molded product having excellent mechanical strength (permanent compression set and the like) from the thermoplastic elastomer composition and easily gives a thermoplastic elastomer composition having good moldability.

For the purpose of improving physical properties such as oil resistance, moldability and flexibility, copolymerizable monomers may be copolymerized in the acrylic rubber. Examples thereof include alkyl methacrylates such as methyl methacrylate and ethyl methacrylate; alkoxyalkyl methacrylates such as 2-methoxyethyl methacrylate and 2-ethoxyethyl methacrylate; carboxyl group-containing monomers such as (meth)acrylic acid, crotonic acid and maleic acid; hydroxyl group-containing monomers such as 2-hydroxyethyl (meth) acrylate and 2-hydroxypropyl (meth)acrylate; active chlorine-containing monomers such as 2-chloroethyl vinyl ether, vinyl monochloroacetate and allyl chloroacetate; fluorine (meth)acrylates such as trifluoromethylmethyl (meth)acrylate and 2-trifluoromethylethyl (meth)acrylate; aromatic vinyl compounds such as styrene and α-methylstyrene; vinyl nitrites such as acrylonitrile and methacrylonitrile; vinylamides such as acrylamide, methacrylamide and N-methylolacrylamide; α-olefins such as ethylene, propylene and isobutene; conjugated dienes such as butadiene, isoprene and chloroprene; bifunctional (meth)acrylates; trifunctional (meth)acrylates; vinyl acetate; and vinyl chloride.

The copolymerized amount of these copolymerizable monomers is preferably 40% by mass or less, more preferably 30% by mass or less per the total amount of constituents other than copolymerizable monomers in the acrylic rubber. The copolymerized amount of 40% by mass or less easily provides an acrylic rubber well-balancedly having physical properties such as flexibility, oil resistance, low-temperature characteristics and moldability.

The glass transition temperature (Tg) of the component (A) acrylic rubber is preferably −15° C. or lower, more preferably −20° C. or lower. The use of the acrylic rubber having a Tg of −15° C. or lower does not make excessively high the brittle temperature of the thermoplastic elastomer composition and easily provides a molded product capable of withstanding the practical use.

The content of the component (A) acrylic rubber in the thermoplastic elastomer composition is 50 to 80 parts by mass per the total 100 parts by mass of the components (A) and (B). The acrylic rubber content of 50 to 85 parts by mass easily provides a thermoplastic elastomer composition excellent in flexibility, permanent compression set and moldability.

<Component (B) Thermoplastic Polyester Resin>

The component (B) thermoplastic polyester resin improves the moldability of the thermoplastic elastomer composition and causes a molded product thereof to exhibit heat resistance and oil resistance. The thermoplastic polyester resin includes any thermoplastic saturated polyester having ester bonds in the main chain. The thermoplastic polyester resin can be obtained by a known method such as the polycondensation of a dicarboxylic acid component and a dihydroxy component, the polycondensation of an oxycarbonic acid component or the polycondensation of these three components, and may be a homopolyester or a copolyester. These thermoplastic polyester resins are used alone or in a proper combination of two or more thereof.

The thermoplastic polyester resin may be non-crystalline, but is preferably crystalline in view of excellence in oil resistance. The melting point of the thermoplastic polyester resin is preferably 100° C. or higher and further is most preferably between 160 and 280° C. in terms of heat resistance and oil resistance under high temperature. Preferred examples of the thermoplastic polyester resin include polyethylene terephthalate, polybutylene terephthalate, polytrimethylene terephthalate, polyethylene naphthalate, and polybutylene naphthalate.

The content of the component (B) thermoplastic polyester resin in the thermoplastic elastomer composition is 15 to 50 parts by mass per the total 100 parts by mass of the components (A) and (B). The thermoplastic polyester resin content of 15 to 50 parts by mass easily provides a thermoplastic elastomer composition having favorable moldability and easily gives a molded product excellent in flexibility and permanent compression set.

<Component (C) Graft Copolymer>

The component (C) graft copolymer has compatibility (affinity) with the component (A) acrylic rubber and the component (B) thermoplastic polyester resin and causes the functions of the components (A) and (B) to be sufficiently and synergistically exhibited. The graft copolymer can impart good moldability to the thermoplastic elastomer composition while maintaining the flexibility thereof. The graft copolymer is a graft copolymer comprising an olefin polymer segment formed from ethylene and a polar monomer and a vinyl copolymer segment formed from vinyl monomers at least including an alkyl acrylate ester, wherein one of the olefin polymer segment and the vinyl copolymer segment forms a matrix phase and the other forms a dispersed phase in the matrix phase.

The olefin polymer segment is formed from ethylene and a polar monomer; specific examples thereof include ethylene-vinyl acetate copolymer, ethylene-vinyl acetate-glycidyl methacrylate copolymer, ethylene-vinyl acetate-maleic anhydride copolymer, ethylene-methyl acrylate copolymer, ethylene-ethyl acrylate copolymer, ethylene-n-butyl acrylate copolymer, ethylene-ethyl acrylate-glycidyl methacrylate copolymer, maleic anhydride-modified ethylene-ethyl acrylate copolymer, ethylene-methyl methacrylate copolymer, ethylene-dimethylaminomethyl methacrylate copolymer, ethylene-vinyl alcohol copolymer, an ethylene oxide adduct of ethylene-vinyl alcohol copolymer, ethylene-acrylic acid copolymer, ethylene-methacrylic acid copolymer, and an ionomer in which bonding is formed through a metal ion such as sodium and zinc between molecules of ethylene-acrylic acid copolymer or ethylene-methacrylic acid copolymer.

The proportion of the polar monomer in the olefin polymer segment is preferably 10 to 50 parts by mass, more preferably 15 to 40 parts by mass per the total 100 parts by mass of ethylene and the polar monomer. The copolymer having a polar monomer proportion of 10 to 50 parts by mass easily provides a molded product having excellent mechanical properties such as tensile strength and elongation in addition to flexibility and oil resistance because it has low hardness, high oil resistance and excellent mechanical strength.

The vinyl copolymer segment is formed from vinyl monomers at least including an alkyl acrylate ester. By being compatibilized with the component (A) acrylic rubber, the vinyl copolymer segment enhances the moldability of the thermoplastic elastomer composition and can improve the mechanical properties of a molded product thereof.

Examples of the alkyl acrylate ester include methyl acrylate, ethyl acrylate, n-propyl acrylate, isopropyl acrylate, n-butyl acrylate, isobutyl acrylate, tert-butyl acrylate, n-pentyl acrylate, n-hexyl acrylate, n-heptyl acrylate, n-octyl acrylate, 2-ethylhexyl acrylate, nonyl acrylate, decyl acrylate, and dodecyl acrylate. Among these, in terms of oil resistance and compatibility with the component (A) acrylic rubber, particularly preferred are alkyl acrylate esters whose alkyl group has 2 to 4 carbon atoms, such as ethyl acrylate and n-butyl acrylate.

The amount of the alkyl acrylate ester contained in 100 parts by mass of the vinyl copolymer segment is preferably 20 parts by mass or more, more preferably 30 parts by mass or more. The amount of the alkyl acrylate ester of 20 parts by mass or more makes sufficient the compatibility between the graft copolymer and the acrylic rubber and less easily causes mechanical strength reduction and appearance deterioration in a molded product of the thermoplastic elastomer composition.

In the vinyl copolymer segment, at least one type of vinyl monomer may be copolymerized in addition to the alkyl acrylate ester. Examples of the copolymerizable vinyl monomer include an alkyl methacrylate such as methyl methacrylate and ethyl methacrylate; an alkoxy (meth)acrylate such as 2-methoxyethyl (meth)acrylate and 2-ethoxyethyl (meth)acrylate; an epoxy group-containing monomer such as glycidyl (meth)acrylate, vinyl glycidyl ether and allyl glycidyl ether; a carboxyl group-containing monomer such as (meth)acrylic acid, crotonic acid and maleic acid; a hydroxyl group-containing monomer such as 2-hydroxyethyl (meth)acrylate and 2-hydroxypropyl (meth)acrylate; an aromatic vinyl compound such as styrene, methylstyrene, dimethylstyrene, ethylstyrene, isopropylstyrene and chlorostyrene; an α-substituted styrene such as α-methylstyrene and α-ethylstyrene; and a vinyl nitrile such as acrylonitrile and methacrylonitrile. The vinyl monomer(s) may be preferably copolymerized in an amount of 80 parts by mass or less, more preferably 70 parts by mass or less in 100 parts by mass of the vinyl copolymer segment.

The vinyl copolymer forming the vinyl copolymer segment typically has a number average polymerization degree of 5 to 10,000, preferably 10 to 5,000, most preferably 100 to 2,000. The number average polymerization degree of 5 to 10,000 improves the moldability of the thermoplastic elastomer composition, causes the vinyl copolymer segment to be easily compatibilized with the component (A) acrylic rubber, and less easily produces appearance deterioration in a molded product of the composition. The polymerization degree also reduces the melt viscosity of the vinyl copolymer segment and therefore easily provides a thermoplastic elastomer composition having high moldability.

The proportion of the olefin polymer segment contained in 100 parts by mass of the graft copolymer is typically 5 to 95 parts by mass, preferably 20 to 90 parts by mass, most preferably 30 to 85 parts by mass. Therefore, the proportion of the vinyl copolymer segment is typically 5 to 95 parts by mass, preferably 10 to 80 parts by mass, most preferably 15 to 70 parts by mass. The olefin polymer segment proportion of 5 to 95 parts by mass easily provides a thermoplastic elastomer composition having high moldability. The proportion also causes the olefin polymer segment to be easily compatibilized with the component (A) acrylic rubber and therefore less easily produces deterioration of appearance and mechanical properties in a molded product of the thermoplastic elastomer composition.

As described above, the graft copolymer is a polyphase structure in which one segment forms a matrix phase and the other segment forms a dispersed phase in the matrix phase. The segment forming a dispersed phase is present as fine particles having an average particle diameter of 0.001 to 10 μm in the matrix phase. The average particle diameter of 0.001 to 10 μm causes the component (C) graft copolymer to be easily compatibilized with the component (A) acrylic rubber and less easily produces deterioration of appearance and mechanical properties in a molded product of the thermoplastic elastomer composition.

The grafting method in producing the graft copolymer may be any generally known method including the chain transfer method and the ionizing radiation method, but the following method is most preferable. This is because the method makes the production simple and easy, has a high grafting efficiency, produces no secondary flocculation of the vinyl polymer segment due to heat and facilitates the blending of the component (C) graft copolymer with the component (A) acrylic rubber and the component (B) thermoplastic polyester resin.

A method for producing the graft copolymer is described below. The olefin polymer formed from ethylene and a polar monomer suspended in water is impregnated with vinyl monomers including a vinyl monomer at least containing an alkyl acrylate ester, radical polymerizable organic peroxides represented by general formula 1 or 2 alone or a mixture of two or more thereof, and a radical polymerization initiator. Subsequently, the vinyl monomers and the radical polymerizable organic peroxide(s) are copolymerized in the olefin polymer formed from ethylene and a polar monomer to provide a grafting precursor. The graft copolymer can be obtained by melt-kneading the grafting precursor.

The grafting precursor is a structure in which a copolymer of the vinyl monomers including a vinyl monomer at least containing an alkyl acrylate ester with the radical polymerizable organic peroxide(s) is dispersed in each particle of the olefin polymer formed from ethylene and a polar monomer. The grafting precursor preferably contains 0.003 to 0.73% by mass of the copolymer of the vinyl monomers with the radical polymerizable organic peroxide(s) dispersed therein in active oxygen equivalent. The active oxygen amount of 0.003 to 0.73% by mass makes appropriate the ability of the grafting precursor to be grafted and less easily produces gels in grafting. The active oxygen amount here can be determined by extracting a vinyl copolymer from the grafting precursor by solvent extraction and measuring the active oxygen amount of the vinyl copolymer by the iodometry method.

As used herein, the term "radical polymerizable organic peroxide" refers to a monomer containing an ethylenically unsaturated group and a peroxide bond group. A compound represented by general formula 1 or 2 is preferable as the radical polymerizable organic peroxide.

[Formula 1]

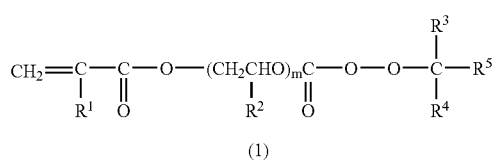

(1)

In the formula 1, $R^1$ represents a hydrogen atom or an alkyl group having 1 or 2 carbon atoms; $R^2$ represents a hydrogen atom or a methyl group; $R^3$ and $R^4$ each represent an alkyl group having 1 to 4 carbon atoms; $R^5$ represents an alkyl group having 1 to 12 carbon atoms, a phenyl group, an alkyl-substituted phenyl group or a cycloalkyl group having 3 to 12 carbon atoms; and m represents 1 or 2.

[Formula 2]

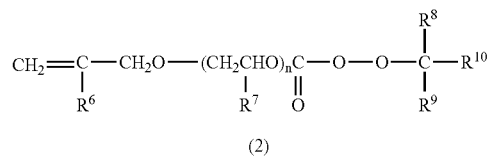

(2)

In the formula 2, $R^6$ represents a hydrogen atom or an alkyl group having 1 to 4 carbon atoms; $R^7$ represents a hydrogen atom or a methyl group; $R^8$ and $R^9$ each represent an alkyl group having 1 to 4 carbon atoms; $R^{10}$ represents an alkyl group having 1 to 12 carbon atoms, a phenyl group, an alkyl-substituted phenyl group, or a cycloalkyl group having 3 to 12 carbon atoms; and n represents 0, 1, or 2.

Examples of the radical polymerizable organic peroxide of formula 1 include tert-butylperoxyacryloyloxyethyl carbonate, tert-amylperoxyacryloyloxyethyl carbonate, tert-hexylperoxyacryloyloxyethyl carbonate, tert-butylperoxymethacryloyloxyethyl carbonate, tert-amylperoxymethacryloyloxyethyl carbonate, and tert-hexylperoxymethacryloyloxyethyl carbonate. Examples of the radical polymerizable organic peroxide of formula 2 include tert-butylperoxyallyl carbonate, tert-amylperoxyallyl carbonate, tert-hexylperoxyallyl carbonate, tert-butylperoxymethallyl carbonate, tert-amylperoxymethallyl carbonate, and tert-hexylperoxymethallyl carbonate. A preferred radical polymerizable organic peroxide is tert-butylperoxyacryloyloxyethyl carbonate, tert-butylperoxymethacryloyloxyethyl carbonate, tert-butylperoxyallyl carbonate, or tert-butylperoxymethallyl carbonate.

The component (C) graft copolymer can be obtained by melt-kneading the grafting precursor. The peroxide bond in the vinyl copolymer is cleaved by heating during the melt kneading; the generated radical undergoes hydrogen abstraction reaction in the olefin polymer; and subsequent grafting reaction produces the graft copolymer. Specific examples of the kneader used in the melt-kneading include a Banbury mixer, a Brabender mixer, a pressure kneader, a single screw extruder, a twin screw extruder, and a roll. The kneading temperature is typically in the range of 100 to 300° C., preferably 120 to 280° C. The kneading temperature of 100 to 300° C. allows the grafting precursor to be completely molten and sufficiently blended at low melt viscosity and therefore can prevent the phase separation and delamination of the graft copolymer as well as the decomposition and gelation thereof in grafting.

It is probable that in the thus obtained component (C) graft copolymer the olefin polymer segment is oriented to (has compatibility with) the component (B) thermoplastic polyester resin with the vinyl polymer segment oriented to (having compatibility with) the component (A) acrylic rubber. Then, in the thermoplastic elastomer composition, the components (A) and (B) are probably compatibilized by the component (C) to synergistically exert the functions of the components (A) and (B).

The proportion of the component (C) graft copolymer or the precursor thereof in the thermoplastic elastomer composition is 1 to 35 parts by mass per the total 100 parts by mass of the component (A) acrylic rubber and the component (B) thermoplastic polyester resin. The graft copolymer proportion of 1 to 35 parts by mass sufficiently improves the moldability of the composition and can provide a molded product excellent in oil resistance.

The crosslinking agent will be described. The crosslinking agent used to obtain the thermoplastic elastomer composition crosslinks the acrylic rubber by covalently bonding to the epoxy group of the acrylic rubber. Examples of the crosslinking agent include a polyamine, a polyol, a polycarboxylic acid, an acid anhydride, an organic carboxylic acid ammonium salt, and a dithiocarbamate. Among these compounds, particularly preferred is a polycarboxylic acid or an acid anhydride.

Specific examples of the polycarboxylic acid include succinic acid, glutaric acid, adipic acid, azelaic acid, sebacic acid, dodecanedicarboxylic acid, octadecanedicarboxylic acid, dodecenylsuccinic acid, butanetetracarboxylic acid, cyclopentanedicarboxylic acid, cyclopentanetricarboxylic acid, cyclopentanetetracarboxylic acid, cyclohexanedicarboxylic acid, cyclohexanetricarboxylic acid, phthalic acid, trimellitic acid, trimesic acid, and pyromellitic acid. Specific examples of the acid anhydride include anhydrides of these polycarboxylic acids.

The usage amount of the crosslinking agent varies depending on the type of the selected crosslinking agent; however, it is typically determined in the range of 0.05 to 5 parts by mass per 100 parts by mass of the component (A) acrylic rubber. The crosslinking agent usage amount of 0.05 to 5 parts by mass allows the crosslinking to occur unexcessively and sufficiently, easily provides a molded product excellent in mechanical strength and oil resistance and easily gives a thermoplastic elastomer composition having good moldability. A crosslinking agent usage amount of less than 0.05 part by mass makes the crosslinking insufficient and reduces the mechanical strength and oil resistance of a molded product obtained from the thermoplastic elastomer composition; more than 5 parts by mass does not provide good moldability because the thermoplastic elastomer composition is excessively crosslinked.

The plasticizer will be described. A trimellitate ester or a polyester, or a mixture thereof may be contained in the thermoplastic elastomer composition to impart plasticity thereto. The specific advantages from containing the plasticizer lie in improving the moldability of the thermoplastic elastomer and the flexibility, brittle temperature and oil resistance of a molded product thereof.

Examples of the trimellitate ester include 2-ethylhexyl trimellitate, tri-n-octyl trimellitate, triisononyl trimellitate, and triisodecyl trimellitate. Examples of the polyester include adipic acid polyester, sebacic acid polyester, trimellitic acid polyester, pyromellitic acid polyester, polyether-ester, and polyetherpolyester. These plasticizers may be used alone or in a combination of two or more thereof.

The blending amount of the plasticizer is preferably 60 parts by mass or less per 100 parts by mass of the component (A) acrylic rubber in terms of the mechanical strength of the resultant molded product. A blending amount of the plasticizer of more than 60 parts by mass tends to increase the reduction in the mechanical strength of a molded product obtained from the thermoplastic elastomer composition.

The thermoplastic elastomer composition may contain various additives in addition to the above components. Examples of such additives include an antioxidant such as phenolic and aminic antioxidants, an ultraviolet stabilizer such as a hindered amine, a processing aid such as stearic acid, and a colorant or pigment such as titanium dioxide. The blending amount of each additive is preferably 5 parts by mass or less per 100 parts by mass of the thermoplastic elastomer composition. The blending amount of a strengthening agent or filler such as carbon black, white carbon, clay and talc, a flame retardant such as magnesium hydroxide, and the like is preferably 70 parts by mass or less per 100 parts by mass of the thermoplastic elastomer composition.

The thermoplastic elastomer composition is then produced by dynamically crosslinking a composition composed of the above-described components using a crosslinking agent. A Banbury mixer, a Brabender mixer, a pressure kneader, a single screw extruder, a twin screw extruder, a roll or the like may be used as an apparatus for dynamic crosslinking. The dynamic crosslinking means that the component (A) acrylic rubber, the component (B) thermoplastic polyester resin and the component (C) graft copolymer are melt-kneaded at a temperature higher than the melting point of the thermoplastic polyester resin to crosslink the epoxy group of the acrylic rubber under high shear during the kneading. In general, the acrylic rubber thus dynamically crosslinked is finely dispersed in the matrix phase of thermoplastic polyester resin. Formation of the phase structure allows the elastomer composition to have thermoplasticity despite that the acrylic rubber is crosslinked. Thus, the thermoplastic elastomer composition can be processed or reprocessed using a conventional molding apparatus by a previous molding method (processing technique) for a thermoplastic resin, such as extrusion, injection, blow and compression molding methods.

In producing the thermoplastic elastomer composition, the grafting precursor may also be used as a material instead of the graft copolymer. This is because the grafting precursor undergoes grafting reaction by melt-kneading during the production of the thermoplastic elastomer composition to form the graft copolymer. In other words, the grafting precursor can be used to simultaneously perform the steps of grafting reaction and dynamic crosslinking. Thus, the method for producing the thermoplastic elastomer composition using the grafting precursor is preferable in terms of a simplified production process.

The crosslinking reaction proceeds by adding a crosslinking agent during the melt kneading. The crosslinking agent can be simultaneously charged, together with the component (A) acrylic rubber, the component (B) thermoplastic polyester resin and the component (C) graft copolymer, into a kneader to perform dynamic crosslinking. In most cases, it is more effective that the acrylic rubber, thermoplastic polyester resin and graft copolymer or grafting precursor are charged into a kneader and sufficiently melted and kneaded, followed by introducing a crosslinking agent to conduct dynamic crosslinking. However, when a crosslinking agent having a slow reaction rate or a slow-acting crosslinking agent is used, the crosslinking agent may be added before the acrylic rubber, thermoplastic polyester resin and graft copolymer are sufficiently melted and kneaded. When the crosslinking reaction is started by adding the crosslinking agent, the viscosity of the composition increases; the time at which the viscosity becomes constant is the time of completion of crosslinking reaction. The viscosity shows various changes until it becomes constant: for example, the viscosity reaches a maximum and then declines to a constant value, or it continues to increase to a plateau.

Generally, a plasticizer and various additives are preferably sufficiently blended before a crosslinking agent is added. This is because the addition of the plasticizer and various additives midway in the reaction or after the end of reaction hardly disperses the plasticizer and various additives in the composition. Thus, a method is preferable which involves adding the plasticizer and various additives at the beginning of the kneading or midway therein, sufficiently blending them in the composition and then adding the crosslinking agent.

The temperature for the melting, blending and dynamic crosslinking is appropriate in the range of 100 to 350° C.

corresponding to from the melting point of the thermoplastic polyester resin to the decomposition-starting temperature of the acrylic rubber. The temperature is more preferably 150 to 300° C., particularly preferably 180 to 280° C.

The effect of the representative embodiment will be described. The thermoplastic elastomer composition is prepared by dynamically crosslinking the component (A) acrylic rubber, the component (B) thermoplastic polyester resin and the component (C) graft copolymer using a crosslinking agent. The thermoplastic elastomer composition has a structure where the component (B) thermoplastic polyester resin forms a matrix in which the component (A) acrylic rubber is dispersed. In addition, the component (C) graft copolymer is present so as to be compatibilized with the components (A) and (B). As a result, the functions of the components (A) and (B) are sufficiently and synergistically exhibited.

According to the representative embodiment, the following advantages are obtained.

The thermoplastic elastomer composition of the representative embodiment is obtained by dynamically crosslinking a composition comprising the component (A) acrylic rubber, the component (B) thermoplastic polyester resin and the component (C) graft copolymer using 0.05 to 5 parts by mass of a crosslinking agent per 100 parts by mass of the component (A). In the thermoplastic elastomer composition, the component (A) acrylic rubber is dispersed in the component (B) thermoplastic polyester resin, and the component (C) graft copolymer is present so as to have compatibility with both of the components (A) and (B). As a result, the functions of the components (A) and (B) are sufficiently and synergistically exhibited. Thus, the composition can exhibit good moldability and provides a molded product rich in flexibility and capable of exhibiting heat resistance and oil resistance.

The thermoplastic elastomer composition containing a trimellitate ester or a polyester as a plasticizer has high moldability; a molded product having high flexibility and oil resistance can be produced from the thermoplastic elastomer composition.

Heating a molded product of the thermoplastic elastomer composition melts the component (B) thermoplastic polyester resin forming a matrix, which makes possible the remolding of the molded product and enables the recycling properties thereof to be exerted. Thus, a scrap or product generated in the production process for the thermoplastic elastomer composition can be easily reprocessed using a conventional molding method and molding apparatus, showing that the composition is excellent in recycling properties.

Examples of the representative embodiment will now be described. Synthesis examples for materials used in Examples and Comparative Examples are presented below.

SYNTHESIS EXAMPLE 1

Production of Acrylic Rubber (A-1)

Into a flask equipped with a stirrer, a thermometer, a condenser, a dropping device and a nitrogen gas inlet tube were charged 1,000 g of ion exchanged water, 10 g of sodium dodecyl sulfate, 0.5 g of sodium hydrogen sulfite, 0.005 g of ferrous sulfate and 0.01 of sodium ethylenediamine tetraacetate, which were then heated up to 30° C. under stirring while blowing nitrogen gas. Subsequently, 5 g of ammonium persulfate was added as a polymerization initiator thereto, to which 500 g of a monomer mixture (250 g of ethyl acrylate, 230 g of n-butyl acrylate and 20 g of glycidyl methacrylate (GMA)) were then dropwise added over a period of 3 hours, followed by polymerizing the mixture for further 3 hours to provide an emulsion. The emulsion was then salted out by dropwise adding to a 0.5% by mass calcium chloride aqueous solution over a period of one hour. The precipitate was well washed with water and then dried at 80° C. to provide an acrylic rubber containing 4 parts by mass of GMA (A-1). The acrylic rubber (A-1) had a Tg of −27° C.

SYNTHESIS EXAMPLE 2

Production of Acrylic Rubber (A-2)

An acrylic rubber containing 4 parts by mass of GMA (A-2) was produced in the same way as that in Synthesis Example 1 except for changing the composition of the monomer mixture to 250 g of ethyl acrylate, 100 g of n-butyl acrylate, 130 g of 2-methoxyethyl acrylate and 20 g of GMA. The acrylic rubber (A-2) had a Tg of −25° C.

SYNTHESIS EXAMPLE 3

Production of Acrylic Rubber (A-3)>

An acrylic rubber containing 0.3 part by mass of GMA (A-3) was produced in the same way as that in Synthesis Example 1 except for changing the composition of the monomer mixture to 268.5 g of ethyl acrylate, 100 g of n-butyl acrylate, 130 g of 2-methoxyethyl acrylate and 1.5 g of GMA. The acrylic rubber (A-3) had a Tg of −28° C.

SYNTHESIS EXAMPLE 4

Production of Acrylic Rubber (A-4)

An acrylic rubber containing 16 parts by mass of GMA (A-4) was produced in the same way as that in Synthesis Example 1 except for changing the composition of the monomer mixture to 190 g of ethyl acrylate, 100 g of n-butyl acrylate, 130 g of 2-methoxyethyl acrylate and 80 g of GMA. The acrylic rubber (A-4) had a Tg of −21° C.

SYNTHESIS EXAMPLE 5

Production of Grafting Precursor (c-1)

In a 5-liter stainless autoclave were dissolved 2,000 g of pure water and 2.5 g of polyvinyl alcohol as a suspending agent. Therein was placed 700 g of ethylene-ethyl acrylate copolymer (NUC6570 from Nippon Unicar Co., Ltd., ethyl acrylate: 25 parts by mass), followed by stirring and dispersing the mixture. Into the autoclave was charged a mixed monomer composed of 2 g of benzoyl peroxide (Nyper BW from NOF Corporation) as a polymerization initiator, 6 g of tert-butylperoxymethacryloyloxyethyl carbonate and 300 g of a vinyl monomer mixture (150 g of n-butyl acrylate and 150 g of 2-hydroxypropyl methacrylate). Subsequently, the polymerization initiator, the radical polymerizable organic peroxide and the vinyl monomers were impregnated into ethylene-vinyl acetate copolymer by heating up the autoclave to 60 to 65° C. and stirring for 2 hours. The autoclave was then heated up to 80 to 85° C. and kept at the temperature for 6 hours to complete the polymerization, followed by washing with water and drying to provide a grafting precursor (c-1). When the grafting precursor (c-1) was observed under a scanning electron microscope (from Hitachi Ltd.), it was a polyphase structure in which resin particles in a perfect spherical form having an average diameter of 0.3 to 0.5 μm are uniformly dispersed.

SYNTHESIS EXAMPLE 6

Production of Graft Copolymer (C-1)

A grafting precursor (C-1) was obtained by extruding the grafting precursor (c-1) provided in Synthesis Example 5 at a temperature of 180° C. and a revolution speed of 100 rpm using a Laboplast Mill single screw extruder (from Toyo Seiki Seisaku-Sho Ltd.), followed by grafting reaction to provide a graft copolymer (C-1).

SYNTHESIS EXAMPLE 7

Production of Grafting Precursor (c-2)

A grafting precursor (c-2) was obtained in the same way as that in Synthesis Example 4 except for changing the composition of the vinyl monomer mixture to 50 g of n-butyl acrylate, 150 g of 2-hydroxypropyl methacrylate and 100 g of styrene. The grafting precursor was a polyphase structure in which resin particles in a perfect spherical form having an average diameter of 0.3 to 0.4 μm are uniformly dispersed.

Commercial products described below were used as other materials.

Thermoplastic polyester resin: Duranex 2002 (polybutylene terephthalate available from WinTech Polymer Ltd.)

Plasticizer: Adekacizer C8 (trioctyl trimellitate available from Asahi Denka Co., Ltd.) and Polycizer W-230-S (polyester adipates available from Dainippon Ink And Chemicals, Inc.)

Crosslinking agent: Butanetetracarboxylic Acid (available from Daicel Chemical Industries, Ltd.)

Antioxidant: Irganox 1010 (a hindered phenolic antioxidant available from Ciba Specialty Chemicals Inc.)

An evaluation method for a thermoplastic elastomer composition is then described below. A test piece was prepared by molding a thermoplastic elastomer composition into the form of a sheet 2 mm in thickness by hot press at 240° C., and subjected to various evaluations. Various test methods and conditions are described below. The normal state physical properties mean physical properties at normal temperature and normal pressure.

Tensile Test

Tensile strength (MPa), 100% modulus (MPa) and elongation (%) were measured at a test speed of 500 mm/min. according to JIS K 6301.

Hardness

Hardness was measured using a Type-A spring hardness tester according to JIS K 6301.

Permanent Compression Set

Permanent compression set (%) was measured after 22 hours under a temperature of 150° C. at a compressibility of 25% according to JIS K 6301.

Oil Resistance

According to JIS K 6301, the test piece was dipped in No. 3 oil at 150° C. for 70 hours and then measured for the mass change (%).

Heat Resistance

According to JIS K 6301, the test piece was allowed to stand in a Geer oven aging tester at 150° C. for 70 hours and then measured for the tensile strength change (%), elongation change (%) and amount of hardness change.

Molding Appearance

The thermoplastic elastomer composition was cut into pellet form and subjected to extrusion molding at a temperature of 240° C. and a revolution speed of 100 rpm using a Laboplast Mill single screw extruder (from Toyo Seiki Seisaku-Sho Ltd.) equipped with a spider-type tube die having a core diameter of 8 mm and a die ring inner diameter of 10 mm to mold a tube. The surface condition of the tube was observed and evaluated as "0" when the surface is smooth and as "X" when defective appearance such as surface roughening was seen.

EXAMPLE 1

Into a Laboplast Mill Mixer (from Toyo Seiki Seisaku-Sho Ltd.) heated at 250° C. were charged 70 parts by mass of acrylic rubber A-1 in Synthesis Example 1, 30 parts by mass of Duranex 2002, 7 parts by mass of graft copolymer C-1 in Synthesis Example 6, 10 parts by mass of Adekacizer C8 and 0.5 part by mass of Irganox 1010, which were then melt-kneaded at a revolution speed of 100 rpm. The kneading was carried out until the torque reached a constant value by the melting and uniform mixing of all materials. When the torque had reached a constant value, 0.3 part by mass of butanetetracarboxylic acid was charged as a crosslinking agent thereinto, followed by continuing the kneading. When the torque had been observed to be in the state of being increased from immediately after charging the crosslinking agent and then reached a constant value, the kneading was terminated. The resultant thermoplastic elastomer composition was taken out of the Laboplast Mill Mixer and compressed and cooled into a pancake form by cool press. Subsequently, it was molded into the form of a sheet 2 mm in thickness by hot press at 240° C. and subjected to the above various evaluations. The results are shown in Table 1.

EXAMPLE 2 and COMPARATIVE EXAMPLES 1 and 2

In place of acrylic rubber A-1, acrylic rubber A-2, acrylic rubber A-3 and acrylic rubber A-4 were used in Example 2, Comparative Example 1 and Comparative Example 2, respectively, to prepare thermoplastic elastomer compositions in the otherwise same way as that in Example 1. Then, the above various evaluations were performed as described in Example 1. The results are shown in Table 1.

TABLE 1

|  |  | Exp. 1 | Exp. 2 | Comp. Exp. 1 | Comp. Exp. 2 |
|---|---|---|---|---|---|
| Acrylic rubber | A-1 | 70 | — | — | — |
|  | A-2 | — | 70 | — | — |
|  | A-3 | — | — | 70 | — |
|  | A-4 | — | — | — | 70 |
| Duranex 2002 |  | 30 | 30 | 30 | 30 |
| Graft copolymer C-1 |  | 7 | 7 | 7 | 7 |
| Adekacizer C8 |  | 10 | 10 | 10 | 10 |

TABLE 1-continued

|  |  | Exp. 1 | Exp. 2 | Comp. Exp. 1 | Comp. Exp. 2 |
|---|---|---|---|---|---|
| Irganox 1010 |  | 0.5 | 0.5 | 0.5 | 0.5 |
| Butanetetracarboxylic acid |  | 0.3 | 0.3 | 0.3 | 0.3 |
| Normal state physical properties | Tensile strength (MPa) | 9.9 | 8.9 | 3.1 | Sheet-form test piece for evaluations could not be prepared due to poor moldability |
|  | 100% modulus (MPa) | 6.8 | 6.2 | 2.7 |  |
|  | Elongation (%) | 200 | 180 | 160 |  |
|  | Hardness | 85 | 85 | 71 |  |
|  | Permanent compression set (%) | 49 | 52 | 75 |  |
| Oil resistance | Mass change (%) | 20 | 10 | 34 |  |
| Heat resistance | Tensile strength change (%) | 18 | 15 | 22 |  |
|  | Elongation change (%) | −15 | −19 | 2 |  |
|  | Hardness change | 2 | 3 | 6 |  |
| Molding appearance |  | ○ | ○ | X |  |

As shown in Table 1, results similar to those in Example 1 were obtained in Example 2 for tensile strength, 100% modulus, elongation, hardness, permanent compression set, oil resistance and heat resistance. On the other hand, in Comparative Example 1 where the amount of GMA in the acrylic rubber was small outside the scope of the present invention, the sheet-form molded product was inferior in tensile strength and permanent compression set and also had defective appearance. In Comparative Example 2, because the amount of GMA in the acrylic rubber was excessive outside the scope of the present invention, the composition lacked flowability, had poor moldability and provided a sheet having cracks; thus, the various evaluations could not be carried out.

EXAMPLES 3 to 5 and COMPARATIVE EXAMPLES 3 and 4

In Examples 3 to 5, a grafting precursor was used in place of the graft copolymer of Example 1 to prepare a thermoplastic elastomer composition with the blending ratio described in Table 2 by an operation similar to that in Example 1. Then, the various evaluations were performed as described in Example 1. The results are shown in Table 2.

by mass or more of alkyl acrylate ester was contained in the vinyl copolymer segment of the graft copolymer, had excellent physical properties of tensile strength, elongation and hardness compared to the sheet of Example 5.

In contrast, in the case of Comparative Example 3, the tensile strength and oil resistance of the sheet-form molded product were reduced because ethylene-ethyl acrylate copolymer was used in place of the graft copolymer. In the case of Comparative Example 4, the thermoplastic elastomer composition had reduced moldability because it contained no graft copolymer, which deteriorated the appearance of the molded product thereof.

EXAMPLE 6 and COMPARATIVE EXAMPLES 5 to 9

In Example 6, a grafting precursor was used to prepare a thermoplastic elastomer composition with the blending ratio described in Table 3 by an operation similar to that in Example 1. In Comparative Example 5, the acrylic rubber and the thermoplastic polyester resin were insufficiently and excessively blended, respectively; in Comparative Example 6, the acrylic rubber and the thermoplastic polyester resin

TABLE 2

|  |  | Exp. 3 | Exp. 4 | Exp. 5 | Comp. Exp. 3 | Comp. Exp. 4 |
|---|---|---|---|---|---|---|
| Acrylic rubber A-1 |  | 67 | — | — | — | — |
| Acrylic rubber A-2 |  | — | 67 | 67 | 67 | 67 |
| Duranex 2002 |  | 33 | 33 | 33 | 33 | 33 |
| Grafting precursor c-1 |  | 12 | 12 | — | — | — |
| Grafting precursor c-2 |  | — | — | 12 | — | — |
| Ethylene-ethyl acrylate copolymer (NUC6570) |  | — | — | — | 12 | — |
| Polycizer W-230-S |  | 15 | 15 | 15 | 15 | 15 |
| Irganox 1010 |  | 0.5 | 0.5 | 0.5 | 0.5 | 0.5 |
| Butanetetracarboxylic acid |  | 0.4 | 0.4 | 0.4 | 0.4 | 0.4 |
| Normal state physical properties | Tensile strength (MPa) | 8.1 | 7.2 | 6.8 | 5.7 | 7 |
|  | 100% modulus (MPa) | 5 | 4.4 | 5.4 | 4.3 | 5.6 |
|  | Elongation (%) | 240 | 230 | 200 | 160 | 190 |
|  | Hardness | 80 | 81 | 87 | 83 | 83 |
|  | Permanent compression set (%) | 39 | 45 | 50 | 47 | 43 |
| Oil resistance | Mass change (%) | 31 | 19 | 21 | 26 | 6 |
| Heat resistance | Tensile strength change (%) | 16 | 11 | 8 | 0 | 14 |
|  | Elongation change (%) | −7 | −19 | −8 | −5 | −5 |
|  | Hardness change | 3 | 5 | 4 | 3 | 3 |
| Molding appearance |  | ○ | ○ | ○ | ○ | X |

As shown in Table 2, good results were obtained in Examples 3 to 5 for tensile strength, 100% modulus, elongation, hardness, permanent compression set, oil resistance and heat resistance. In the comparison of Examples 4 and 5, the sheet-form molded product of Example 4, wherein 20 parts were excessively and insufficiently blended, respectively. In Comparative Example 7, the grafting precursor was excessively blended. In Comparative Example 8, the crosslinking agent was insufficiently blended; in Comparative Example 9, the crosslinking agent was excessively blended. Then, the various evaluations were performed as described in Example 1. The results are shown in Table 3.

TABLE 3

|  |  | Exp. 6 | Comp. Exp. 5 | Comp. Exp. 6 | Comp. Exp. 7 | Comp. Exp. 8 | Comp. Exp. 9 |
|---|---|---|---|---|---|---|---|
| Acrylic rubber A-2 | | 65 | 40 | 90 | 65 | 65 | 65 |
| Duranex 2002 | | 35 | 60 | 10 | 35 | 35 | 35 |
| Grafting precursor c-1 | | 17 | 17 | 17 | 40 | 17 | 17 |
| Polycizer W-230-S | | 25 | 15 | 35 | 25 | 25 | 25 |
| Irganox 1010 | | 0.5 | 0.5 | 0.5 | 0.5 | 0.5 | 0.5 |
| Butanetetracarboxylic acid | | 0.4 | 0.3 | 0.5 | 0.4 | 0.01 | 4 |
| Normal state physical properties | Tensile strength (MPa) | 6.5 | 10.3 | Sheet-form test piece for evaluations could not be prepared due to poor moldability | 6.2 | 2.6 | Sheet-form test piece for evaluations could not be prepared due to poor moldability |
| | 100% modulus (MPa) | 3.9 | 9.5 | | 3.9 | 1.9 | |
| | Elongation (%) | 230 | 120 | | 200 | 180 | |
| | Hardness | 72 | 96 | | 74 | 58 | |
| | Permanent compression set (%) | 40 | — | | 53 | 75 | |
| Oil resistance | Mass change (%) | 11 | 4 | | 43 | 24 | |
| Heat resistance | Tensile strength change (%) | 15 | 11 | | −23 | 20 | |
| | Elongation change (%) | −9 | −15 | | −29 | 17 | |
| | Hardness change | 4 | 4 | | 6 | 8 | |
| Molding appearance | | ○ | ○ | | ○ | X | |

As shown in Table 3, good results were obtained in Example 6 for tensile strength, 100% modulus, elongation, hardness, permanent compression set, oil resistance and heat resistance. In contrast, in Comparative Example 5, a sheet-form molded product hard and poor in flexibility was obtained because the blending amount of the acrylic rubber was insufficient and that of the thermoplastic polyester resin was excessive. In Comparative Example 6, poor moldability occurred because the blending amount of the acrylic rubber was excessive and that of the thermoplastic polyester resin was insufficient. In Comparative Example 7, a sheet-form molded product inferior in oil resistance was obtained because the blending amount of the grafting precursor was excessive. In Comparative Example 8, sufficient crosslinking did not occurred because the blending amount of the crosslinking agent was insufficient, which reduced various physical properties and led to poor molding appearance. In Comparative Example 9, crosslinking proceeded excessively because the blending amount of the crosslinking agent was excessive, which resulted in poor molding.

The representative embodiment may be modified as follow.

The thermoplastic elastomer composition may be also prepared by properly selecting and blending a plurality of types of the component (A) acrylic rubber, the component (B) thermoplastic polyester resin and the component (C) graft copolymer, respectively, according to the purpose.

The invention claimed is:

1. A thermoplastic elastomer composition, comprising:
   a component (A) which is 50 to 85 parts by mass of an acrylic rubber prepared by copolymerizing a monomer mixture containing at least one of an alkyl acrylate ester and an alkoxyalkyl acrylate ester, and 0.5 to 15% by mass of an epoxy group-containing monomer;
   a component (B) which is 15 to 50 parts by mass of a thermoplastic polyester resin having a melting point between 160 and 280° C.; and
   a component (C) which is 1 to 35 parts by mass of a graft copolymer or a precursor thereof, per the total 100 parts by mass of the components (A) and (B), the graft copolymer or the precursor containing an olefin polymer segment formed from ethylene and a polar monomer and a vinyl copolymer segment formed from an alkyl acrylate ester and at least one vinyl monomer selected from the group consisting of an alkoxy methacrylate, an alkoxy acrylate, an epoxy group-containing monomer, a carboxyl group-containing monomer, a hydroxyl group-containing monomer, an aromatic vinyl monomer, an α-substituted styrene, and a vinyl nitrile, and one of the olefin polymer segment and the vinyl copolymer segment forming a matrix phase and the other forming a dispersed phase in the matrix phase,
   wherein the thermoplastic elastomer composition is obtained by dynamically crosslinking a composition composed of components (A), (B) and (C) with 0.05 to 5 parts by mass of a crosslinking agent per 100 parts by mass of the component (A), and the crosslinking agent is a polycarboxylic acid.

2. The thermoplastic elastomer composition according to claim 1, characterized in that the elastomer composition further comprises a trimellitate ester or a polyester as a plasticizer.

3. The thermoplastic elastomer composition according to claim 1, characterized in that in the acrylic rubber of component (A), the alkyl acrylate ester has an alkyl group having 2 to 4 carbon atoms and the alkoxyalkyl acrylate ester has an alkyl group having 2 to 4 carbon atoms.

4. The thermoplastic elastomer composition according to claim 1, characterized in that in the component (C) graft copolymer, the alkyl acrylate ester forming the vinyl polymer segment has an alkyl group having 2 to 4 carbon atoms.

5. A molded product obtained by molding the thermoplastic elastomer composition according to claim 1.

6. A method for producing the thermoplastic elastomer composition according to claim 1, comprising the steps of:
   preparing an acrylic rubber by copolymerizing a monomer mixture mainly comprising at least one of an alkyl acrylate ester and an alkoxyalkyl acrylate ester, wherein the mixture comprises 0.5 to 15% by mass of an epoxy group-containing monomer;
   preparing a graft copolymer or a precursor thereof comprising an olefin polymer segment formed from ethylene and a polar monomer and a vinyl copolymer segment formed from an alkyl acrylate ester and at least one vinyl monomer selected from the group consisting of an alkoxy methacrylate, an alkoxy acrylate, an epoxy group-containing monomer, a carboxyl group-containing monomer, a hydroxyl group-containing monomer, an aromatic vinyl monomer, an α-substituted styrene, and a vinyl nitrile, wherein one of the olefin polymer segment and the vinyl copolymer segment forms a matrix phase and the other forms a dispersed phase in the matrix phase; and dynamically crosslinking a composition comprising 50 to 85 parts by mass of the acrylic rubber, 15 to 50 parts by mass of the thermoplastic polyester resin having a melting point between 160 and 280° C. and 1 to 35 parts by mass of the graft copolymer or a precursor thereof per the total 100 parts by mass of the acrylic rubber and the thermoplastic polyester resin using 0.05 to 5 parts by mass of a crosslinking agent per 100 parts by mass of the acrylic rubber.

7. The thermoplastic elastomer composition according to claim 1, wherein the dispersed phase of component (C) having an average particle diameter of 0.001 to 10 microns.

* * * * *